United States Patent
Kosuge

(10) Patent No.: US 9,017,172 B2
(45) Date of Patent: Apr. 28, 2015

(54) VIDEO GAME CONTROL SERVER, VIDEO GAME CONTROL APPARATUS, AND VIDEO GAME CONTROL PROGRAM PRODUCT

(71) Applicant: Kabushiki Kaisha Square Enix, Tokyo (JP)

(72) Inventor: Shingo Kosuge, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 30 days.

(21) Appl. No.: 13/855,967

(22) Filed: Apr. 3, 2013

(65) Prior Publication Data

US 2013/0281186 A1 Oct. 24, 2013

(30) Foreign Application Priority Data

Apr. 20, 2012 (JP) .................................. 2012-097147

(51) Int. Cl.
- A63F 13/00 (2014.01)
- A63F 13/30 (2014.01)
- A63F 13/35 (2014.01)
- A63F 13/46 (2014.01)

(52) U.S. Cl.
CPC ................. *A63F 13/12* (2013.01); *A63F 13/35* (2014.09); *A63F 13/46* (2014.09)

(58) Field of Classification Search
USPC .......................................... 463/17, 19, 20–42
See application file for complete search history.

(56) References Cited

U.S. PATENT DOCUMENTS

| | | | | |
|---|---|---|---|---|
| 8,157,631 B2 * | 4/2012 | Lancaster et al. | ............... | 463/13 |
| 8,257,164 B2 * | 9/2012 | Bigelow et al. | ................. | 463/21 |
| 8,449,364 B2 * | 5/2013 | Lancaster et al. | ............... | 463/13 |
| 2009/0111572 A1 * | 4/2009 | Bigelow et al. | ................. | 463/21 |
| 2010/0087241 A1 * | 4/2010 | Nguyen et al. | .................. | 463/17 |
| 2010/0283204 A1 * | 11/2010 | Mahon | ........................... | 273/292 |
| 2011/0183740 A1 * | 7/2011 | Mahon | ............................. | 463/16 |
| 2011/0207519 A1 * | 8/2011 | Falciglia, Sr. | ................... | 463/19 |

FOREIGN PATENT DOCUMENTS

| | | |
|---|---|---|
| JP | 2003-225469 A | 8/2003 |
| JP | 2004-041714 | 2/2004 |
| JP | 2006-254979 A | 9/2006 |

OTHER PUBLICATIONS

U.S. Appl. No. 13/855,231 to Shingo Kosuge, filed Apr. 2, 2013.
Japan Office action, dated Oct. 1, 2013 along with an english translation thereof.

* cited by examiner

*Primary Examiner* — Masud Ahmed
(74) *Attorney, Agent, or Firm* — Greenblum & Bernstein, P.L.C.

(57) ABSTRACT

A video game control server for controlling progress of a video game via a communication network is provided. A game board information on a game board formed in a matrix manner is stored in the video game control server. It is determined whether a clear condition is satisfied or not. The clear condition associated with each of a plurality of squares on the game board is cleared by playing the video game by a player. In a case where it is determined that the clear condition associated with a square is satisfied, the square is set up to a condition accomplished square. In a case where a square is newly set up to a condition accomplished square and an arrangement pattern of the condition accomplished squares on the game board thereby becomes a predetermined privilege applying pattern, a privilege is applied to the player.

8 Claims, 7 Drawing Sheets

PLAYER INFORMATION

| PLAYER ID | LEVEL | BELONGING GROUP | ... | HISTORY INFORMATION ||||| LOGIN HISTORY |
| | | | | NUMBER OF TIMES OF BATTLES | NUMBER OF TIMES OF COMBINATION | EVENT | ... | |
|---|---|---|---|---|---|---|---|---|
| P0001 | 10 | G0001 | ... | 10 | 5 | ..... | ... | TEN STRAIGHT DAYS |
| P0002 | 5 | G0001 | | 5 | 3 | ..... | ... | THREE STRAIGHT DAYS |
| ⋮ | ⋮ | ⋮ | ⋮ | ⋮ | ⋮ | ⋮ | ⋮ | ⋮ |

Fig. 4

GAME BOARD INFORMATION

| PLAYER ID | SIZE (ROW × COLUMN) | PRIVILEGE APPLYING PATTERN | PRIVILEGE | ... | SQUARE INFORMATION ||||
|---|---|---|---|---|---|---|---|---|
| | | | | | POSITION (ROW, COLUMN) | CLEAR CONDITION | ... | ACCOMPLISHMENT FLAG |
| P0001 | 5 × 5 | One line of condition accomplished squares is completed. | REWARD | ... | 1, 1 | TWENTY FELLOWS | ... | 0 |
| | | | | | 1, 2 | 50 TIMES OF BATTLES | ... | 0 |
| | | Two lines of condition accomplished squares are completed. | RARE REWARD | | 1, 3 | LEVEL 15 | ... | 0 |
| | | | | | 1, 4 | TEN TIMES OF COMBINATION | ... | 0 |
| | | Three lines of condition accomplished squares are completed. | VERY RARE REWARD | | 1, 5 | TENTH DAY OF LOGIN | ... | 1 |
| | | | | | 2, 1 | TEN TIMES OF COMBINATION | ... | 0 |
| | | Six lines of condition accomplished squares are completed. | VERY RARE REWARD × 5 | | ⋮ | ⋮ | ⋮ | ⋮ |
| | | | | | 5, 5 | TEN FELLOWS | ... | 0 |

Fig. 5

CLEAR CONDITION INFORMATION

| CLEAR CONDITION | DIFFICULTY LEVEL | ... | SELECTION CONDITION |
|---|---|---|---|
| TEN TIMES OF COMBINATION | LOW | ... | ...... |
| TENTH DAY OF LOGIN | LOW | ... | |
| ⋮ | ⋮ | ⋮ | ⋮ |

VIDEO GAME CONTROL SERVER, VIDEO GAME CONTROL APPARATUS, AND VIDEO GAME CONTROL PROGRAM PRODUCT

CROSS-REFERENCE TO RELATED APPLICATION

The present disclosure relates to subject matter contained in Japanese Patent Application No. 2012-097147, filed on Apr. 20, 2012, the disclosure of which is expressly incorporated herein by reference in its entirety.

BACKGROUND OF THE INVENTION

1. Field of the Invention

The present invention relates to a video game control server for controlling progress of a video game, a video game control apparatus, and a video game control program product.

2. Description of the Related Art

Heretofore, a game system in which a predetermined game is carried out as a common event via a network in each of a plurality of video game processing apparatuses is known (see Japanese Patent Application Publication No. 2003-225469, for example).

In such a game system, it is important for a player to continue to participate in a common event. In conventional game systems, there is one intended to prevent a player from stopping playing a video game by being configured so as to match a player who satisfies a predetermined condition with other player among a plurality of players, for example (see Japanese Patent Application Publication No. 2006-254979, for example).

However, there has been a problem that it is difficult to maintain interest of a player in a video game depending upon the content of an event, such as a video game that each player can clear individually, by means of only the conventional game system such as matching of players. Further, it is thought to provide a reward such as an item in the video game or the like to a player who clears an event. However, in this case, it is assumed a problem that a participation status of the event is biased depending upon the content of the reward.

SUMMARY OF THE INVENTION

The present invention has been made in order to solve the problems described above, and it is an object of the present invention to maintain interest of a player in a video game.

In order to achieve the above object, the present invention is directed to a video game control server controlling progress of a video game via a communication network. In this case, the video game is carried out by one or more video game control apparatuses, and the one or more video game control apparatuses are respectively operated by a plurality of players. The video game control server according to the present invention includes a game board information storer for storing game board information on a game board, the game board being formed in a matrix manner.

The video game control server also includes a clear condition determiner for determining whether a clear condition is satisfied or not, the clear condition being cleared by playing the video game by a player, the clear condition being associated with each of a plurality of squares on the game board.

The video game control server also includes a condition accomplished square setter for setting up a square to a condition accomplished square in a case where the clear condition determiner determines that the clear condition associated with the square is satisfied.

The video game control server also includes a privilege applier for applying a privilege to the player in a case where the condition accomplished square setter newly sets up a square to a condition accomplished square and an arrangement pattern of the condition accomplished squares on the game board thereby becomes a predetermined privilege applying pattern.

By configuring the video game control server as described above, it becomes possible to maintain interest of a player in a video game.

In the video game control server according to the present invention, it is preferable that the video game control server further includes a game board information creator for creating the game board information, wherein the game board information creator includes: a clear condition selector for selecting a clear condition to be associated with each of the squares on the game board from a plurality of clear conditions; and a clear condition setter for associating the clear condition selected by the clear condition selector with the corresponding square, and wherein the clear condition selector selects a clear condition for each of the plurality of squares in accordance with a predetermined selection condition.

In the video game control server according to the present invention, it is preferable that the predetermined selection condition is a condition defined to determine a clear condition to become a selection target in accordance with a game difficulty level set up to the video game or a progress degree of the video game.

In the video game control server according to the present invention, it is preferable that the predetermined selection condition is a condition defined to determine a clear condition for each square to become a selection target in accordance with a difficulty level of fulfillment of the privilege applying pattern.

In the video game control server according to the present invention, it is preferable that the clear condition includes at least one of participation in a predetermined event in the video game, the number of times of battles, and a login history.

In the video game control server according to the present invention, it is preferable that the privilege applying pattern includes an arrangement pattern in which lines of a predetermined number of condition accomplished squares are lined up on the game board.

Further, in another aspect of the present invention, the present invention is directed to a video game control apparatus for controlling progress of a video game. The video game control apparatus according to the present invention includes a game board information storer for storing game board information of a game board, the game board being formed in a matrix manner.

The video game control apparatus also includes a clear condition determiner for determining whether a clear condition is satisfied or not, the clear condition being cleared by playing the video game by a player, the clear condition being associated with each of a plurality of squares on the game board.

The video game control apparatus also includes a condition accomplished square setter for setting up a square to a condition accomplished square in a case where the clear condition determiner determines that the clear condition associated with the square is satisfied.

The video game control apparatus also includes a privilege applier for applying a privilege to the player in a case where the condition accomplished square setter newly sets up a square to a condition accomplished square and an arrangement pattern of the condition accomplished squares on the game board thereby becomes a predetermined privilege applying pattern.

Moreover, in still another aspect of the present invention, the present invention is directed to a video game control program product for causing a computer to control progress of a video game. In this case, the computer includes a game board information storer for storing game board information on a game board, and the game board is formed in a matrix manner. The video game control program product according to the present invention causes the computer to execute steps including determining whether a clear condition is satisfied or not, the clear condition being cleared by playing the video game by a player, the clear condition being associated with each of a plurality of squares on the game board.

The steps also include setting up a square to a condition accomplished square in a case where it is determined that the clear condition associated with the square is satisfied.

The steps also include applying a privilege to the player in a case where a square is newly set up to a condition accomplished square and an arrangement pattern of the condition accomplished squares on the game board thereby becomes a predetermined privilege applying pattern.

According to the present invention, it becomes possible to maintain interest of a player in a video game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 4 is an explanatory drawing showing an example of a storage state of game board information;

FIG. 5 is an explanatory drawing showing an example of a storage state of clear condition information;

DETAILED DESCRIPTION OF THE INVENTION

Hereinafter, an example of one embodiment according to the present invention will be described with reference to the appending drawings.

Figure 1:
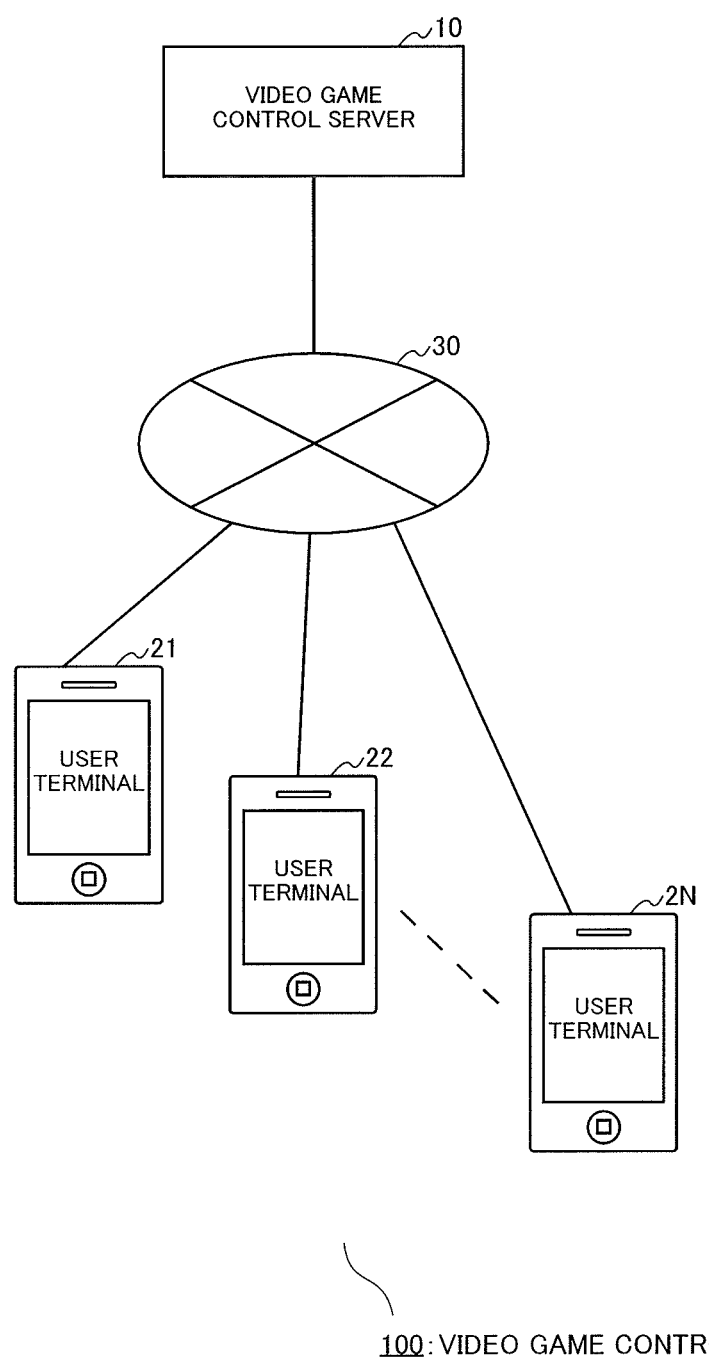
FIG. 1 is a block diagram showing an example of a configuration of a video game control system.

FIG. 1 is a block diagram showing an example of a configuration of a video game control system 100 according to one embodiment of the present invention. As shown in FIG. 1, the video game control system 100 includes: a video game control server 10; and video game control apparatuses (that is, user terminals) 21 to 2N ("N" is an arbitrary integer) used by a plurality of users. In this regard, the configuration of the video game control system 100 is not limited to this. The video game control system 100 may be configured so that the plurality of users uses a single user terminal. Further, the video game control system 100 may be configured so as to include a plurality of servers.

Each of the video game control server 10 and the plurality of user terminals 21 to 2N is connected to a communication network 30 such as the Internet. In this regard, although it is not shown in the drawings, each of the plurality of user terminals 21 to 2N is connected to the communication network 30 by carrying out, by a wireless communication line, data communication with a base station managed by a communication carrier.

The video game control system 100 has various kinds of functions to control a video game that is caused to proceed in response to operations of a user who operates each of the plurality of user terminals 21 to 2N.

The video game control server 10 is managed by a system manager of the video game control system 100, and has various kinds of functions to provide information on the video game to the user terminals 21 to 2N.

The video game control server 10 is configured by an information processing apparatus such as a WWW server, and includes a storage medium for storing various kinds of information. In this regard, it is preferable that the information regarding the video game is managed by the video game control server 10 in the light of the fact that a processing load on a user terminal is to be reduced in the video game control system 100. However, the video game control system 100 may be configured so that only a user terminal manages part of the information on the video game.

Figures 2, 3:
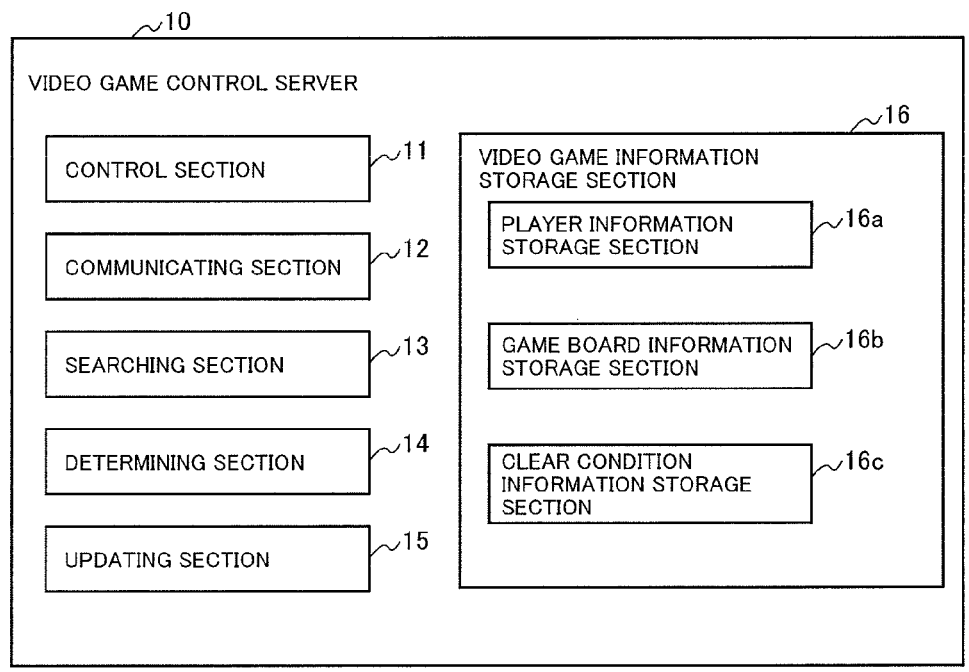
FIG. 2 is a block diagram showing an example of a configuration of a video game control server.
FIG. 3 is an explanatory drawing showing an example of a storage state of player information.

FIG. 2 is a block diagram showing an example of a configuration of the video game control server 10. As shown in FIG. 2, the video game control server 10 includes: a control section 11; a communicating section 12; a searching section 13; a determining section 14; an updating section 15; and a video game information storage section 16.

The control section 11 includes a CPU, a ROM and the like, and has a function to control the whole video game control server 10 in accordance with control programs stored in the video game information storage section 16.

The communicating section 12 has a function to carry out communication with each of the plurality of user terminals 21 to 2N via the communication network 30 such as the Internet.

The searching section 13 has a function to search for information according to progress of the video game (for example, information according to a progress status of the video game in each user terminal) from various kinds of information stored in the video game information storage section 16.

The determining section 14 has a function to carry out various kinds of determination in accordance with progress of the video game. In the present embodiment, the determining section 14 has a function to carry out various kinds of determination in an event managing processing (will be described later, see FIG. 6) on the basis of various kinds of determination conditions stored in the video game information storage section 16.

The updating section 15 has a function to update various kinds of information stored in the video game information storage section 16 in accordance with progress of the video game. In this regard, the video game control system 100 may be configured so that the information using updating processing is acquired from the plurality of user terminals 21 to 2N or is prepared in advance in the video game information storage section 16.

The video game information storage section 16 is configured by a database apparatus, for example. The video game information storage section 16 is a storage medium for storing various kinds of information on the video game whose progress is controlled by the video game control system 100 and various kinds of data such as control programs for the video game.

Here, an outline of a video game carried out by the video game control system 100 will be described. In the present embodiment, the video game control system 100 controls progress of a video game provided with three game systems, which includes: "Tohbatsu (hereinafter, referred to as a "subjugation")" played in each of the plurality of user terminals 21 to 2N; "Kassen (hereinafter, referred to simply as a "battle")" and "Ohtono-sen (hereinafter, referred to as a "great feudal lord battle")" played among the plurality of user terminals 21 to 2N. Moreover, in the present embodiment, various kinds of events, hosted by a manager (or administrator) of the video game or the like, can be held, and a user is allowed to participate in the various kinds of events as part of the video game by accessing the video game control server 10.

The "subjugation" is a game system in which a physical strength value of a user is consumed and progress of a quest is controlled. In the "subjugation", for example, processing to apply an item in the video game (hereinafter, referred to simply as the "item" appropriately), such as a virtual card used in the video game (for example, a military commander card with which image information of a military commander is associated) and a treasure box used in a "battle", to a user with a predetermined probability in a case where the user cleared the quest is carried out. In the present embodiment, an "achievement rate", which is calculated in accordance with an experience value and a physical strength of the user and a type of military commander card possessed by the user, is provided for the quest. In a case where the "achievement rate" reaches a predetermined percentage, "the quest is cleared", and an experience value is applied to the user (or a virtual card used by the user, for example) or an item is provided to the user.

The "battle" is a game system in which a fight using a virtual card is controlled. In the "battle", processing in which two users (or one user and a computer) carry out a fight using virtual cards to which various kinds of values used for the fight, such as an offensive power and a defensive power, are set up, and one user steals a treasure from the other user or loses a treasure to the other user in accordance with a result of the fight, for example, is carried out. In this regard, since a known technique may be utilized for a battle using a virtual card, a detailed explanation herein is omitted.

The "great feudal lord battle" is a game system to control a fight (or battle) in which a plurality of users forms a group (hereinafter, referred to appropriately as an "alliance") and challenges a non-player character (hereinafter, referred to appropriately as an "Ohtono (i.e., a great feudal lord)") to which various kinds of values (for example, a physical strength value, an offensive power value and the like) are set up to the extent that only one player cannot defeat the Ohtono. In the "great feudal lord battle", processing in which a rarer item than one acquired by the "subjugation" is provided to the user in a case where all of the players who belong to the alliance (hereinafter, referred to appropriately as "allied members") fully robs the great feudal lord of its physical strength is carried out, for example.

In this regard, the configuration of the video game realized by the video game control system 100 is not limited to this. For example, various kinds of game systems, including a game system (i.e., a so-called "capsule toy") in which a user consumes a predetermined point that can be acquired in the video game (including a point acquired for free and a point acquired for a fee, for example) and a virtual card is thereby applied to the user, a game system in which a player can acquire a new virtual card by paying a predetermined point to combine a plurality of virtual cards, and the like, can be adopted.

In the present embodiment, the video game information storage section 16 includes a player information storage section 16a, a game board information storage section 16b, and a clear condition information storage section 16c. In this regard, although it is not shown in the drawings, the video game information storage section 16 includes various kinds of storage sections for storing information necessary for controlling the progress of the video game, such as a group information storage section for storing group information that is information on groups configured by a plurality of players (including player(s) that operates in accordance with a predetermined program) (in the present embodiment, the alliance).

The player information storage section 16a is a storage medium for storing player information. The player information is information on players who play the video game (that is, users of the user terminals).

FIG. 3 is an explanatory drawing showing an example of a storage state of the player information stored in the player information storage section 16a. As shown in FIG. 3, the player information contains: a player ID capable of uniquely specifying a player; a level of the player; a group ID capable of uniquely specifying a group to which the player belongs; and history information indicating a status of progress of the video game by a player (hereinafter, referred to simply as a "game progress status") and the like.

In the present embodiment, the history information contains: the number of times the player carried out a battle (hereinafter, referred to as "the number of times of battles"); the number of times the player carried out an operation to combine items in the video game (the number of times of combination); records regarding the events in which the player participated (including an event name of an event, a result when to participate in the even, and the like); and a login history into the video game.

The game board information storage section 16b is a storage medium for storing game board information. The game board information is information on game boards used in events in which the player of the video game can participate. In the present embodiment, the case where the game board information contains game board information on a game board formed in a matrix manner will be described as an example. In this regard, the video game control server 10 may be configured so that a clear condition (will be described later) can be set up to the game board and a privilege applying pattern (will be described later) can also be set up. For example, a form of the game board when to display the same on a display screen is not limited particularly. However, it is preferable that the video game control server 10 is configured so that the player can recognize squares to each of which a clear condition is set up, an arrangement pattern of the square in which the corresponding clear condition has been cleared, and the like.

FIG. 4 is an explanatory drawing showing an example of a storage state of the game board information stored in the game board information storage section 16b. In the present embodiment, the game board information is associated with each player. FIG. 4 illustrates player information associated with a certain player. As shown in FIG. 4, the game board information contains: a player ID capable of uniquely specifying a player; a size of a game board; a privilege applying pattern; a privilege corresponding to the privilege applying pattern; and square information.

Here, the "size" means a size of the game board. In the present embodiment, since the game board is formed in a matrix manner, the size of the game board can be expressed by the number of rows and the number of columns. In this regard, the game board according to the present embodiment includes a plurality of squares that are arranged in horizontal and vertical lines (i.e., in a matrix).

Further, the "privilege applying pattern" means an arrangement of squares (that is, condition accomplished squares) on the game board. A clear condition associated with each of the condition accomplished squares has been accomplished. By showing an arrangement pattern in which condition accomplished squares are defined as a privilege applying pattern in accordance with progress of the video game, a privilege associated with the privilege applying pattern is applied to the player. In this regard, the video game control server 10 may be configured so that the privilege applying pattern and the privilege are set up in advance in accordance with the type of game board. Alternatively, the video game control server 10 may be configured so that the privilege applying pattern and the privilege are set up on the game board in accordance with a predetermined rule (for example, the content of the player information). Hereinafter, in the present embodiment, the case where a privilege applying pattern and privileges are set up in advance in accordance with the type of game board will be described as an example.

Further, the "square information" is information on the squares included in the game board. As shown in FIG. 4, in the present embodiment, the square information contains: a position (row and column) of each of the squares on the game board; a clear condition associated with each square; and an accomplishment flag.

Here, the "clear condition" is a condition that can be cleared by playing the video game whose progress is controlled by the video game control server 10 by the player. As shown in FIG. 4, in the present embodiment, various kinds of content that can be cleared by playing the video game are contained in the clear condition. The content includes participation in a predetermined event and the like in addition to the number of fellows, the number of times of battles, a level, the number of times of combination, and the number of times of login. Further, in the present embodiment, a clear condition that can be cleared in accordance with a status of progress of the video game by other player (for example, other player who belongs to the same group) is contained in the clear conditions.

Further, the "accomplishment flag" means a flag that is set up in order to recognize a clear condition that has been cleared by the player associated with the game board. In the present embodiment, "zero (0)" is set to an accomplishment flag of a clear condition that has never been cleared, and "1" is set to an accomplishment flag of a clear condition that has been cleared (that is, the accomplishment flag corresponding to the condition accomplished square).

The clear condition information storage section 16c is a storage medium for storing clear condition information. The clear condition information is information indicating a clear condition that can be set up to the game board (that is, a clear condition that can be associated with a square on the game board).

FIG. 5 is an explanatory drawing showing an example of a storage state of the clear condition information stored in the clear condition information storage section 16c. As shown in FIG. 5, the clear condition information contains: the content of the clear condition; a difficulty level; and a selection condition.

Here, the "difficulty level" means a level of difficulty to clear the clear condition. In the present embodiment, the difficulty levels of the clear condition includes "low", "middle", and "high" in descending order of difficulty levels. The difficulty level influences on processing to create game board information. The processing to create game board information will be described later in detail (see FIG. 7).

Further, the "selection condition" means a condition when to select a clear condition for each square. In this regard, the selection condition needs not be defined independently from each clear condition. The selection condition may be a condition defined to determine a clear condition as a selection target in accordance with a game difficulty level set up to the video game or a progress degree of the video game. Moreover, in the present embodiment, the selection condition is a condition defined to determine a clear condition as the selection target of each square in accordance with the difficulty level of fulfillment of the privilege applying pattern. More specifically, for example, in a case where the difficulty level of fulfillment of a privilege applying pattern "all of the squares arranged in the first row on the game board are set up to condition accomplished squares" is set up to high, it is defined that the clear condition with higher difficulty level than the clear conditions associated with other rows is associated with each square positioned in a first row of the game board when the clear condition is associated with each of the squares positioned in the first row.

Each of the plurality of user terminals 21 to 2N is managed by a user (or a player) who plays the video game, and is configured by a mobile communication terminal, such as a cellular phone terminal, a PDA (Personal Digital Assistants), or a mobile game device, which is allowed to play a network delivery type video game, for example. Each of the plurality of user terminals 21 to 2N includes hardware (for example, a display device for displaying a game screen, an audio output device, and the like) and software for connecting the user terminal 21 to 2N to the communication network 30 to carry out the video game by communicating with the video game control server 10. In this regard, each of the plurality of user terminals 21 to 2N may be configured so as to have a function to carry out the video game in the same virtual space as each other via the video game control server 10.

Next, an operation of the video game control server 10 according to the present embodiment will be described. In this regard, hereinafter, the case where the user terminal 21 operated by a player X of the plurality of user terminals 21 to 2N communicates with the video game control server 10 and carries out various kinds of processing will be described as an example. Further, the content of operations and processing with no relationship to the present invention may be omitted.

Figure 6:
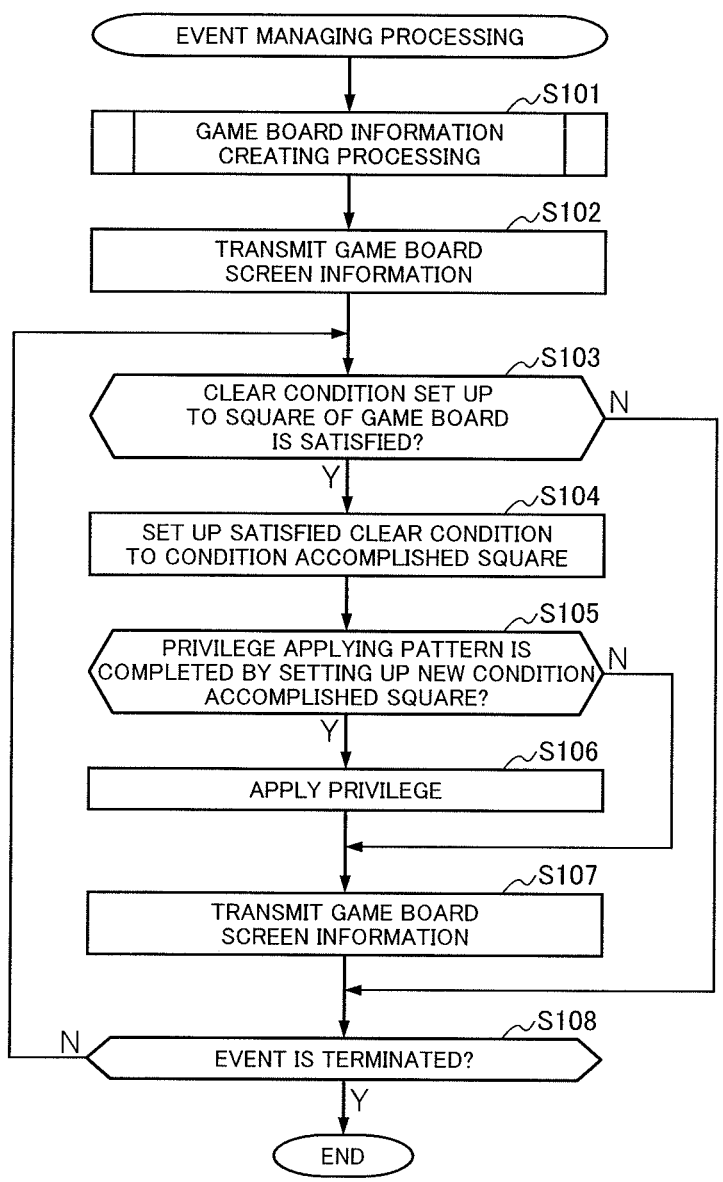
FIG. 6 is a flowchart showing an example of event managing processing.

FIG. 6 is a flowchart showing an example of event managing processing carried out by the video game control server 10. In the event managing processing, processing to manage an event (that is, processing to cause each player to play a video game using his or her user terminal in accordance with the event content) is carried out.

The event managing processing is started in a case where the video game control server 10 determines that current date and time become the date and time when the event is to be held, for example.

In the event managing processing, the video game control server 10 first carries out processing to create game board information associated with the player X (game board information creating processing) (Step S101).

Figure 7:
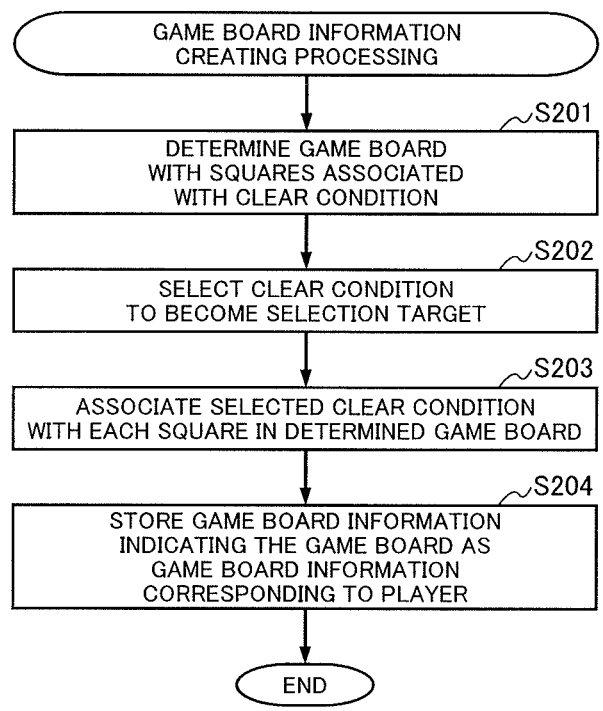
FIG. 7 is a flowchart showing an example of game board information creating processing.

FIG. 7 is a flowchart showing an example of the game board information creating processing carried out by the video game control server 10. In this regard, the content of operations and processing with no relationship to the present invention may be omitted.

In the game board information creating processing, the video game control server 10 first determines a game board provided with squares each of which is to be associated with a clear condition (Step S201). In this regard, a method of determining a game board is not limited particularly. The video game control server 10 may be configured so as to determine a game board that is associated with an event in advance. Alternatively, the video game control server 10 may be configured so as to determine a game board whose size is differentiated in accordance with a player.

When a game board provided with squares each of which a clear condition is associated with (that is, a game board in which each square becomes a setup target of the clear condition) is determined, the video game control server 10 selects a clear condition to become a selection target among the clear condition information stored in the clear condition information storage section 16c (Step S202). In the present embodiment, the video game control server 10 selects the clear condition for each square in accordance with a predetermined selection condition indicated by the clear condition information.

When the clear conditions are selected, the video game control server 10 associates the selected clear conditions with the respective squares in the game board determined in the process at Step S201 (Step S203).

When the clear conditions are associated with the respective squares, the video game control server 10 stores the game board information, which indicates the game board with the squares respectively associated with the clear condition, in the game board information storage section 16b as the game board information corresponding to the player X (Step S204), and causes the processing flow to shift to a process at Step S102 in the event managing processing (see FIG. 6). In the present embodiment, the video game control server 10 associates the player X with the game board by setting up the player ID indicating the player X to the game board information.

When the game board information creating processing is carried out, the video game control server 10 transmits game board screen information to the user terminal 21 (Step S102). The game board screen information is used for causing a display device of the user terminal 21 to display an image of the game board, indicated by the game board information associated with the player X, on the display screen. In this regard, the video game control system 100 may be configured so that part or all of the information on screens and images to be displayed on the display screen of the display device of the user terminal 21 is stored in a storage medium included in the user terminal 21.

Figure 8:
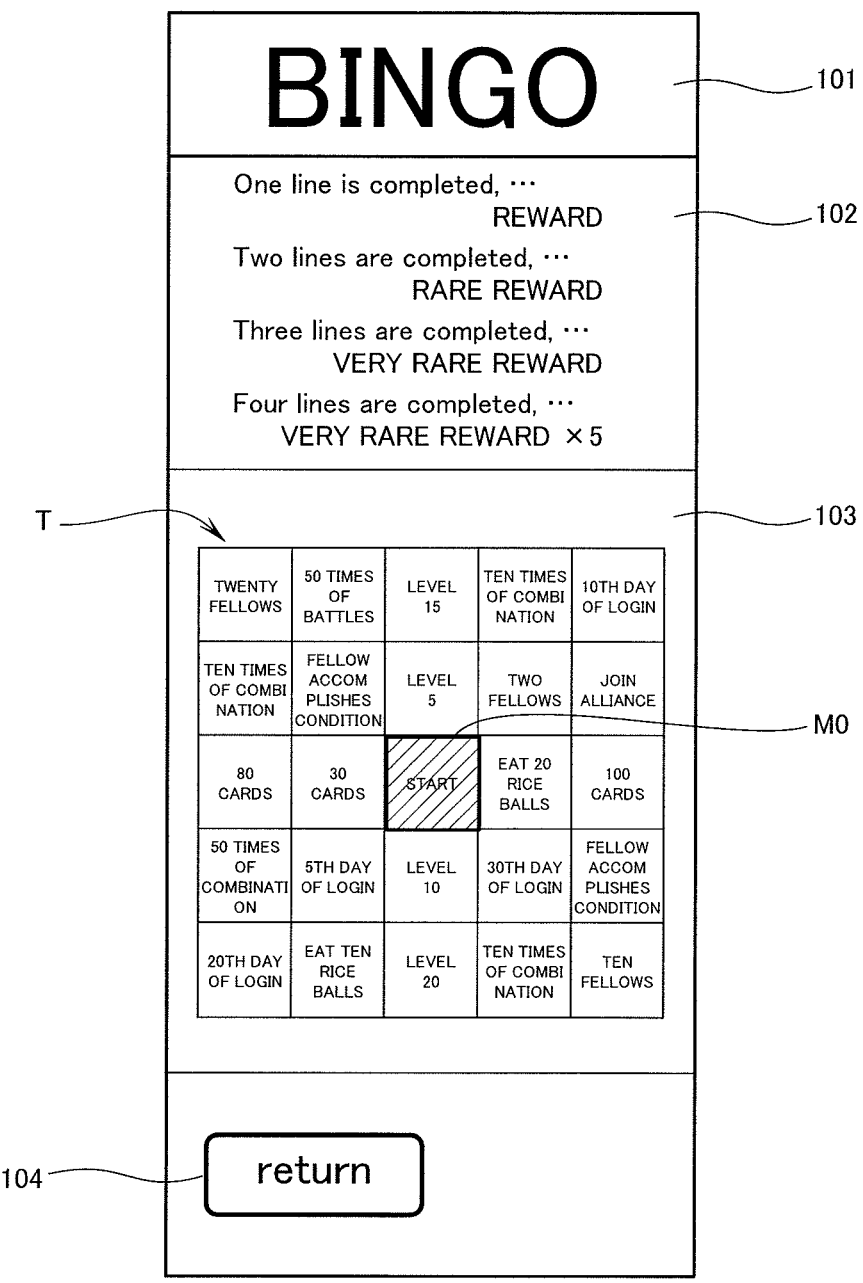
FIG. 8 is an explanatory drawing showing an example of a game board screen.

FIG. 8 is an explanatory drawing showing an example of a game board screen that is to be displayed on the display screen of the user terminal 21. As shown in FIG. 8, an event name display region 101 in which an event name is displayed; a privilege display region 102 in which privileges (which the player X can acquire by clearing a clear condition associated with each square on the game board) are displayed; a game board image display region 103 in which an image (i.e., game board image) T according to the game board information is displayed; and a return button 104 for receiving a request to return the display screen to a previous state; are provided on the game board screen.

It is preferable that the game board image T is configured so that the player X can recognize the clear condition associated with each square. In the present embodiment, a character string indicating the clear condition associated with each square is displayed at a position corresponding to each square. Further, in the present embodiment, the case where a square M0 positioned at the center of the game board (for example, a square positioned at 3 rows and 3 columns in a matrix with 5 rows and 5 columns) is displayed as a condition accomplished square in which a clear condition associated with the square is accomplished from the beginning of the video game will be described as an example. In this regard, in the game board information creating processing, the video game control server may be configured so as to determine the number of squares each of which has become a condition accomplished square from the beginning and positions of the condition accomplished squares in accordance with the content of the player information.

When the game board information is transmitted, the video game control server 10 determines whether the player X plays the video game and the clear condition set up to a square of the game board is thereby satisfied or not (Step S103). Here, in a case where it is determined that the clear condition is not satisfied ("No" at Step S103), the video game control server 10 causes the processing flow to shift to a process at Step S108 (will be described later).

On the other hand, in a case where it is determined that the clear condition is satisfied ("Yes" at Step S103), the video game control server 10 sets up the square for which it is determined that the clear condition is satisfied (that is, the square with which the clear condition accomplished by the player X is associated) to a condition accomplished square (Step S104).

In the present embodiment, the video game control server 10 sets up the accomplishment flag corresponding to the square, for which it is determined that the clear condition is satisfied, to "1", whereby the player can distinguish the condition accomplished square from the other squares.

Subsequently, the video game control server 10 determines whether a condition accomplished square is newly set up and the privilege applying pattern is thereby completed or not (Step S105). In the present embodiment, the video game control server 10 refers to the game board information associated with the player X, and determines whether the arrangement pattern of the condition accomplished squares on the game board becomes the privilege applying pattern or not.

Here, in a case where it is determined that the privilege applying pattern is not completed newly ("No" at Step S105), the video game control server 10 causes the processing flow to shift to a process at Step S107 (will be described later).

On the other hand, in a case where it is determined that the privilege applying pattern is completed newly ("Yes" at Step S105), the video game control server 10 applies the privilege corresponding to the completed privilege applying pattern to the player X (Step S106).

When the privilege is applied, the video game control server 10 transmits game board screen information to the user terminal 21 (Step S107). The game board screen information is used for causing the display device of the user terminal 21 to display the game board screen corresponding to the game board information, in which the condition accomplished square is set up, on the display screen.

Figure 9:
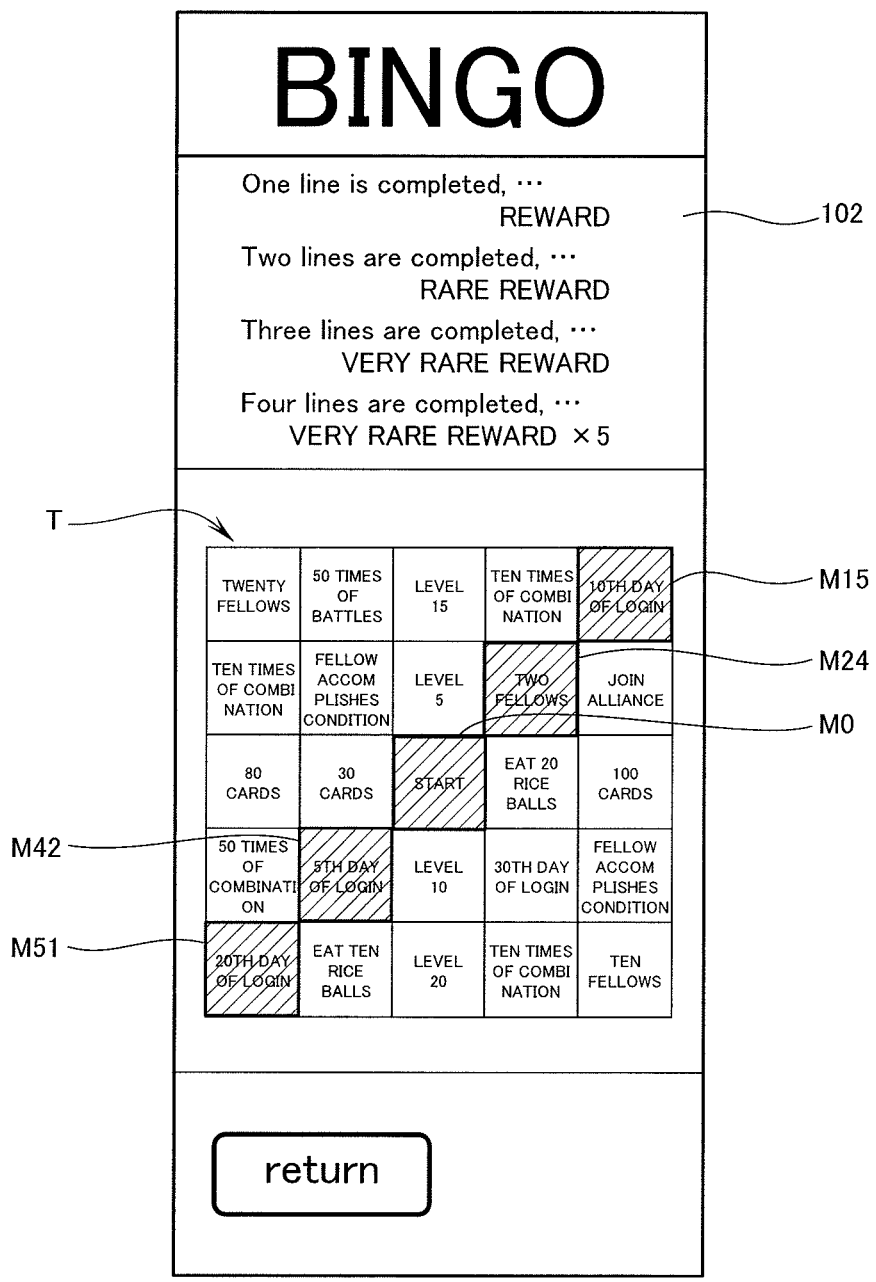
FIG. 9 is an explanatory drawing showing another example of the game board screen.

FIG. 9 is an explanatory drawing showing another example of the game board screen to be displayed on the display screen of the user terminal 21. As shown in FIG. 9, a game board image T in which a plurality of squares M15, M24, M42, M51 corresponding to the cleared clear conditions are indicated in a distinguishable form from the other squares is displayed on the game board screen. Further, as shown in FIG. 9, in a case where the arrangement pattern of the condition accomplished squares on the game board becomes a privilege applying pattern contained in the game board information (more specifically, an arrangement pattern in which one diagonal line is completed by the condition accomplished squares), the video game control server 10 applies a privilege corresponding to the privilege applying pattern to the player X. In this regard, the video game control server 10 may be configured to transmit the game board screen information indicating a game board screen, in which a display form of the privilege display region 102 is changed, to the user terminal 21 at this time so that the player X can recognize the privilege applied to the player X.

When the game board screen information is transmitted, the video game control server 10 determines whether the event is to be terminated or not (Step S108). Here, in a case where it is determined that the event is not to be terminated, for example, because the current date and time is during the event holding period ("No" at Step S108), the video game control server 10 causes the processing flow to shift to the process at Step S103.

On the other hand, in a case where it is determined that the event is to be terminated, for example, because the current date and time passes the event holding period ("Yes" at Step S108), the video game control server 10 terminates the processing herein. In this regard, a determination standard when to determine termination of the event is not particularly limited. For example, the video game control server 10 may be configured so as to terminate the event when all of the squares included in the game board become the condition accomplished squares.

As explained above, in the embodiment described above, the video game control server for controlling progress of a video game carried out by the video game control apparatuses (for example, the user terminal 21) via a communication network 30 is configured so as to: include the game board information storage section 16b for storing game board information on a game board, the game board being formed in a matrix manner; determine whether a clear condition is satisfied or not, the clear condition being cleared by playing the video game by a player, the clear condition being associated with each of a plurality of squares on the game board (for example, Step S103 in FIG. 6); set up a square to a condition accomplished square in a case where it is determined that the clear condition associated with the square is satisfied (for example, Step S104); and apply a privilege to the player in a case where a square is newly set up to a condition accomplished square and an arrangement pattern of the condition accomplished squares on the game board thereby becomes a predetermined privilege applying pattern (for example, in a case where any one line of horizontal rows, vertical columns and diagonal lines becomes the condition accomplished square) (for example, Step S106). Therefore, it becomes possible to maintain interest of a player in a video game.

Namely, the number of condition accomplished squares on the game board is increased as the video game proceeds. Therefore, the player can readily feel a merit to cause the video game to proceed, and this makes it possible to maintain interest of the player in the video game.

Further, in the embodiment described above, the video game control server 10 may be configured so as to: create the game board information (for example, Step S101 in FIG. 6); select a clear condition to be associated with each of the squares on the game board from a plurality of clear conditions (for example, Step S202 in FIG. 7); associate the selected clear condition with the corresponding square (for example, Step S203); and, when to select the clear condition, select a clear condition for each of the plurality of squares in accordance with a predetermined selection condition (for example, a selection condition included in the clear condition information). Therefore, it becomes possible to provide the game board to which the clear conditions according to the game progress status of the player and the like, and this makes it possible to attract interest of the player.

Further, it is preferable that the predetermined selection condition, which is referred to when to select the clear condition for each square, is a condition defined to determine a clear condition to become a selection target in accordance with a game difficulty level set up to the video game or a progress degree of the video game. Since the video game control server 10 is configured so as to determine the clear condition in accordance with a difficulty level of the video game and a progress degree of the video game, it is possible to prevent the player from giving up clearing the video game in the early stages.

Further, it is preferable that the predetermined selection condition, which is referred to when to select the clear condition for each square, is a condition defined to determine a clear condition for each square to become a selection target in accordance with a difficulty level of fulfillment of the privilege applying pattern. Since the video game control server 10 is configured so as to determine the clear condition associated with each square from the plurality of clear conditions in accordance with a difficulty level of fulfillment of the privilege applying pattern, it becomes possible to create the game board in which the clear condition is associated with each square by setting up the difficulty level of fulfillment of the privilege applying pattern. Therefore, it becomes possible to reduce a processing load when to create an event to be used for the game board.

Further, in the embodiment described above, the video game control server 10 may be configured so that the clear condition includes at least one of participation in a predetermined event in the video game, the number of times of battles, and a login history. Therefore, it is possible to encourage the player to cause the video game to proceed effectively.

Further, in the embodiment described above, the video game control server 10 may be configured so that the privilege applying pattern includes an arrangement pattern in which lines of a predetermined number of condition accomplished squares are lined up on the game board. Therefore, a player can recognize a rule of an event with the same feeling as Bingo that is a common game.

In this regard, although it has not been mentioned particularly in the embodiment described above, the game board includes a group shared game board. In this case, for example, the video game control server 10 may be configured so as to: create the game board information indicating the game board associated with the group in accordance with a level of the group itself and the game progress status of each player who belongs to the group; set up the condition accomplished square in accordance with the game progress status of each player who belongs to the group and the like; and apply a privilege to the group. By configuring the video game control server 10 in such a manner, it becomes possible to encourage the players who belong to the group to participate in the video game in a positive manner.

Further, although it has not been mentioned particularly in the embodiment described above, the video game control server 10 may be configured so as to: when to display the game board screen, display the content of a part of the clear conditions with a form so that the player cannot recognize the same; and display the content of the part of the clear conditions so that the player can recognize the same in a case where condition accomplished squares of a specific number are set up. Further, in this case, the video game control server 10 may be configured so as to cause a clear condition, by which the player has to be charged (for example, drawing a so-called capsule toy, using an item in the video game), to appear right before the privilege applying pattern is completed (for example, a state where the privilege applying pattern is completed by setting up the last square in one line of the game board to a condition accomplished square). By configuring the video game control server 10 in such a manner, it is possible to charge the player effectively. Moreover, the video game control server 10 may be configured so as to arrange at least one square associated with the clear condition, by which the player has to be charged, in each row and each column on the game board. Further, the video game control server 10 may be configured so as to use a game board required to charge the player in order to clear the video game and a game board that can be cleared without charge together.

Further, in the embodiment described above, the plurality of user terminals 21 to 2N and the video game control server 10 carry out various kinds of processing described above in accordance with various kinds of control programs (for example, a video game control program product) stored in the respective storage devices.

Further, the video game control system 100 may be configured so that a part or all of the functions included in any one of the user terminal 21 and the video game control server 10 in the video game control system 100 are included in the other one.

Industrial Applicability

The present invention is useful to provide a video game by which it becomes possible to maintain interest of a player in the video game.

What is claimed is:

1. A video game control server for controlling progress of a video game via a communication network, the video game being carried out by one or more video game control apparatuses, the one or more video game control apparatuses being respectively operated by a plurality of players, the video game control server comprising:
   a memory configured to store instructions; and
   a processor configured to execute the instructions wherein:
      the memory is further configured to store game board information on a game board, the game board being formed in a matrix;
      when executed by the processor, the instructions cause the processor to determine whether a clear condition is satisfied or not, the clear condition being cleared by playing the video game by a player, the clear condition being associated with each of a plurality of squares on the game board;
      when executed by the processor, the instructions cause the processor to set up a square to a condition accomplished square in a case where the processor determines that the clear condition associated with the square is satisfied; and
      when executed by the processor, the instructions cause the processor to apply a privilege to the player in a case where the processor newly sets up a square to a condition accomplished square and an arrangement pattern of the condition accomplished squares on the game board becomes a predetermined privilege applying pattern.

2. The video game control server according to claim 1, wherein:
   when executed by the processor, the instructions cause the processor to create the game board information,
   when executed by the processor, the instructions cause the processor to select a clear condition to be associated with each of the squares on the game board from a plurality of clear conditions;
   when executed by the processor, the instructions cause the processor to associate the clear condition selected by the processor with the corresponding square, and
   when executed by the processor, the instructions cause the processor to select a clear condition for each of the plurality of squares in accordance with a predetermined selection condition.

3. The video game control server according to claim 2, wherein the predetermined selection condition is a condition defined to determine a clear condition to become a selection target in accordance with a game difficulty level set up to the video game or a progress degree of the video game.

4. The video game control server according to claim 2, wherein the predetermined selection condition is a condition defined to determine a clear condition for each square to become a selection target in accordance with a difficulty level of fulfillment of the privilege applying pattern.

5. The video game control server according to claim 1, wherein the clear condition includes at least one of participation in a predetermined event in the video game, the number of times of battles, and a login history.

6. The video game control server according to claim 1, wherein the privilege applying pattern includes an arrangement pattern in which lines of a predetermined number of condition accomplished squares are lined up on the game board.

7. A video game control apparatus for controlling progress of a video game, comprising:
   a memory configured to store instructions; and
   a processor configured to execute the instructions wherein:
      the memory is further configured to store game board information of a game board, the game board being formed in a matrix;
      when executed by the processor, the instructions cause the processor to determine whether a clear condition is satisfied or not, the clear condition being cleared by playing the video game by a player, the clear condition being associated with each of a plurality of squares on the game board;
      when executed by the processor, the instructions cause the processor to set up a square to a condition accomplished square in a case where the processor determines that the clear condition associated with the square is satisfied; and
      when executed by the processor, the instructions cause the processor to apply a privilege to the player in a case where the processor newly sets up a square to a condition accomplished square and an arrangement pattern of the condition accomplished squares on the game board becomes a predetermined privilege applying pattern.

8. A video game control program product for causing a computer to control progress of a video game, the computer comprising a game board information storer for storing game board information on a game board, the game board being formed in a matrix manner, the video game control program product causing the computer to execute:
   determining whether a clear condition is satisfied or not, the clear condition being cleared by playing the video game by a player, the clear condition being associated with each of a plurality of squares on the game board;
   setting up a square to a condition accomplished square in a case where it is determined that the clear condition associated with the square is satisfied; and applying a privilege to the player in a case where a square is newly set up to a condition accomplished square and an arrangement pattern of the condition accomplished squares on the game board thereby becomes a predetermined privilege applying pattern.

\* \* \* \* \*